(12) United States Patent
Worthington

(10) Patent No.: US 7,730,139 B2
(45) Date of Patent: Jun. 1, 2010

(54) ASYNCHRONOUS TAMPER-PROOF TAG FOR ROUTING E-MAILS AND E-MAIL ATTACHMENTS

(75) Inventor: Cristian Alfred Worthington, Vancouver (CA)

(73) Assignee: i-fax.com Inc., Vancouver, BC (CA)

( * ) Notice: Subject to any disclaimer, the term of this patent is extended or adjusted under 35 U.S.C. 154(b) by 1457 days.

(21) Appl. No.: 11/030,870

(22) Filed: Jan. 10, 2005

(65) Prior Publication Data

US 2006/0168039 A1    Jul. 27, 2006

(51) Int. Cl.
  *G06F 15/16* (2006.01)
  *G06F 7/00* (2006.01)
  *H04L 29/06* (2006.01)

(52) U.S. Cl. .......................... 709/206; 713/150; 726/21
(58) Field of Classification Search ................... 709/206
   See application file for complete search history.

(56) References Cited

U.S. PATENT DOCUMENTS

| | | | |
|---|---|---|---|
| 5,509,000 A | 4/1996 | Oberlander | |
| 5,958,005 A * | 9/1999 | Thorne et al. ................ | 709/202 |
| 5,999,967 A | 12/1999 | Sundsted | |
| 6,044,154 A * | 3/2000 | Kelly .......................... | 713/155 |
| 6,249,807 B1* | 6/2001 | Shaw et al. ................... | 709/206 |
| 6,484,197 B1* | 11/2002 | Donohue ...................... | 709/206 |
| 6,564,320 B1* | 5/2003 | de Silva et al. ............... | 713/156 |
| 6,640,301 B1 | 10/2003 | Ng | |
| 6,721,784 B1* | 4/2004 | Leonard et al. .............. | 709/206 |
| 6,732,101 B1 | 5/2004 | Cook | |
| 6,732,273 B1 | 5/2004 | Byers | |
| 7,058,683 B1* | 6/2006 | Belissent et al. ............. | 709/206 |
| 7,172,120 B2* | 2/2007 | Schoenberg ........... | 235/462.01 |
| 2002/0007453 A1* | 1/2002 | Nemovicher ................. | 713/155 |
| 2002/0059519 A1* | 5/2002 | Yamagishi et al. ........... | 713/175 |
| 2002/0091782 A1* | 7/2002 | Benninghoff, III .......... | 709/206 |
| 2002/0097877 A1* | 7/2002 | Tanimoto ..................... | 380/277 |
| 2002/0112168 A1* | 8/2002 | Filipi-Martin et al. ....... | 713/183 |
| 2003/0147536 A1* | 8/2003 | Andivahis et al. ........... | 380/277 |
| 2003/0229668 A1* | 12/2003 | Malik .......................... | 709/206 |
| 2004/0019849 A1* | 1/2004 | Weng et al. ................... | 715/513 |
| 2004/0025057 A1* | 2/2004 | Cook ........................... | 713/201 |
| 2004/0111297 A1* | 6/2004 | Schoenberg ................... | 705/3 |
| 2004/0145773 A1* | 7/2004 | Oakeson et al. ............ | 358/1.15 |
| 2004/0221014 A1* | 11/2004 | Tomkow ...................... | 709/206 |
| 2004/0249817 A1* | 12/2004 | Liu et al. ........................ | 707/9 |
| 2005/0010801 A1* | 1/2005 | Spies et al. .................. | 713/200 |
| 2005/0071632 A1* | 3/2005 | Pauker et al. ................ | 713/165 |
| 2005/0114652 A1* | 5/2005 | Swedor et al. .............. | 713/156 |
| 2005/0198170 A1* | 9/2005 | LeMay et al. ................ | 709/206 |
| 2005/0198173 A1* | 9/2005 | Evans .......................... | 709/206 |

OTHER PUBLICATIONS

C. Adams & S. Farrell, Internet X.509 Public Key Infrastructure Certificate Management Protocols, RFC 2510, Mar. 1999.*
Verisign, Digital ID Overview, 2004.*

* cited by examiner

*Primary Examiner*—Saleh Najjar
*Assistant Examiner*—Robert Shaw
(74) *Attorney, Agent, or Firm*—Oyen Wiggs Green & Mutala

(57) ABSTRACT

A method of automatically processing e-mails wherein the e-mail is tagged by the sender with a unique identifier so that the e-mail can be automatically routed or filed. The unique identifier is encrypted to protect it from unauthorized tampering or decoding to avoid misidentification or fraudulent labelling of the e-mails.

17 Claims, 4 Drawing Sheets

ASYNCHRONOUS TAMPER-PROOF TAG FOR ROUTING E-MAILS AND E-MAIL ATTACHMENTS

TECHNICAL FIELD

This invention relates to the field of electronic mail ("e-mail") communication over computer networks, and more particularly to the automated routing and filing of e-mails and e-mail attachments.

BACKGROUND

Currently when an e-mail is received by a receiving e-mail account, the recipient can open the e-mail and view its contents. The e-mail can then be saved to a file, re-routed by forwarding to another e-mail address, or deleted. Some systems, called Automated Responders, exist which analyze the contents of the e-mail and automatically perform a task, such as an automated response to a question sent to a technical support line. In these cases, the e-mail may be filed, routed or deleted automatically by the Automated Responder based on a pre-programmed set of rules that relate to the contents of the e-mail.

U.S. Pat. Nos. 6,732,101 Cook, 6,732,273 Byers and 5,509,000 Oberlander disclose systems in which e-mails are handled or routed according to certain rules or preferences. A problem with existing systems is that the e-mail being received must be filed or deleted based upon actions taken by the recipient, whether by a person, an expert system or a software component resident on the recipient's server. In the event that a person does the opening and filing process, labor costs are incurred and the potential for user error exists. In the event an expert system does the opening and filing, there is a high probability of error as most expert systems are prone to misinterpret the data in the e-mail. In some systems the sender must interact with a software tool on the recipient's server prior to sending the e-mail, which causes inconvenience or obstacles for the sender.

There is therefore a need for a system in which the e-mail can be composed by the sender asynchronously, without concurrently contacting the recipient, so that the e-mail can be automatically processed. It would be additionally useful if the system of identifying the e-mail for automatic routing or filing is impervious to tampering or decoding by unauthorized personnel, so that e-mails can be automatically filed with the certainty that they have not been misidentified or fraudulently labeled.

SUMMARY OF THE INVENTION

The invention provides a method of automatically processing electronic mail messages sent from a sending computer to a recipient computer, the method comprising the steps of:

i) providing a public encryption key, and a corresponding private encryption key stored on a trusted server; ii) the sending computer receiving an identification code which determines how the electronic mail message will be automatically processed, wherein said identification code has been encrypted by said public key;

iii) the sending computer adding the encrypted identification code to an electronic mail message to form a tagged electronic mail message; iv) the sending computer forwarding the tagged electronic mail message to the trusted server; v) the trusted server decrypting the encrypted identification code using the private key; vi) the trusted server forwarding the decrypted identification code and the electronic mail message to the recipient computer; and vii) the recipient computer automatically processing the electronic mail message using the decrypted identification code.

The invention further provides a data processing system for carrying out the foregoing method.

BRIEF DESCRIPTION OF THE DRAWINGS

In drawings which illustrate a preferred embodiment of the invention.

DESCRIPTION

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive, sense.

The following is an explanation of the meaning of certain terms used in this disclosure. E-mails use a protocol called SMTP to travel across the Internet. The addressing of e-mails operates on the basis that each server has an address (the portion of the e-mail address following the "@") and each e-mail account on the server has a name (the portion of the e-mail address preceding the "@"). For example, an e-mail sent to service@i-fax.com is destined to be transmitted to a server called "i-fax.com" and an e-mail account called "service".

E-mail messages are comprised of several elements, including:

Message Header: This section of the e-mail contains vital information that is used by the SMTP protocol on the Internet to route the e-mail to its destination and to identify other vital elements including the sender's identity.

Subject Line: The subject line of an e-mail contains information entered by the sender that generally relates to the e-mail's content.

Body: The "body" of the e-mail is the text portion of the e-mail generally composed by the sender, but can also contain content from a third party (e.g. in cases where the sender is forwarding an e-mail that was received from a third party).

Attachment(s): Other files, such as Microsoft Word™ files or Excel™ spreadsheets, can also be attached to an e-mail.

Figure 1:
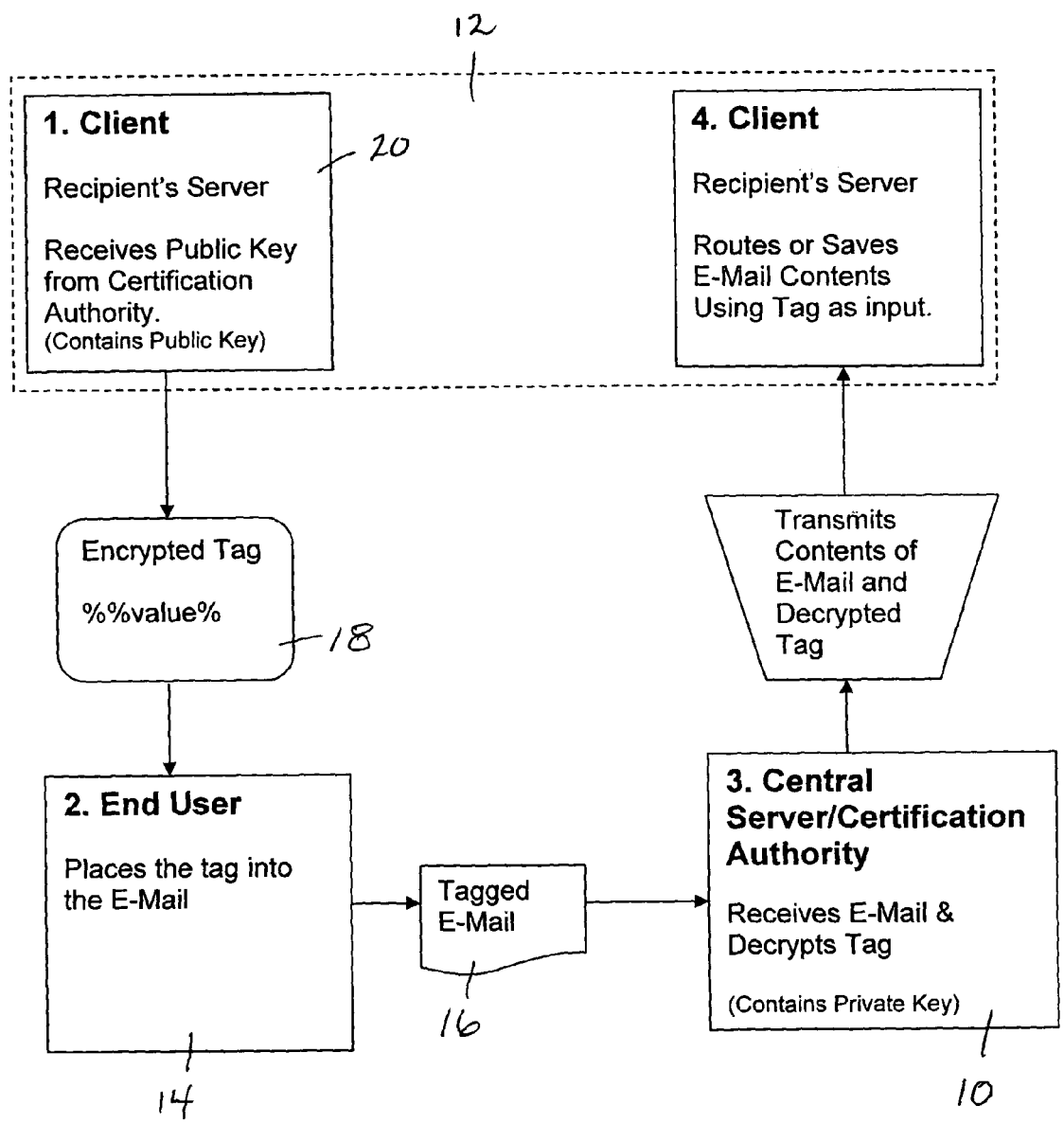
FIG. 1 is a schematic chart illustrating the system of the invention.

With reference to FIG. 1, the system of the invention allows a sender 14 of an e-mail to compose the e-mail asynchronously, without concurrently contacting the recipient 12, so that the e-mail can be automatically filed or routed, wherein the system of identifying the e-mail routing or filing is protected from tampering or decoding by unauthorized personnel, so that e-mails can be automatically filed without unauthorized misidentification or fraudulent labeling. The system of the invention allows the sender to identify the nature of an e-mail that is about to be sent to the recipient 12 using a coding scheme agreed to by the sender and recipient in advance. The system generates a tamper-proof character string which contains the unique identifier or "tag" agreed to by the sender and receiver in advance, by encoding the unique identifier or tag using public key encryption. Using this system, a sender can direct e-mails and e-mail attachments directly to a recipient's filing system or workflow management system.

Figure 2:
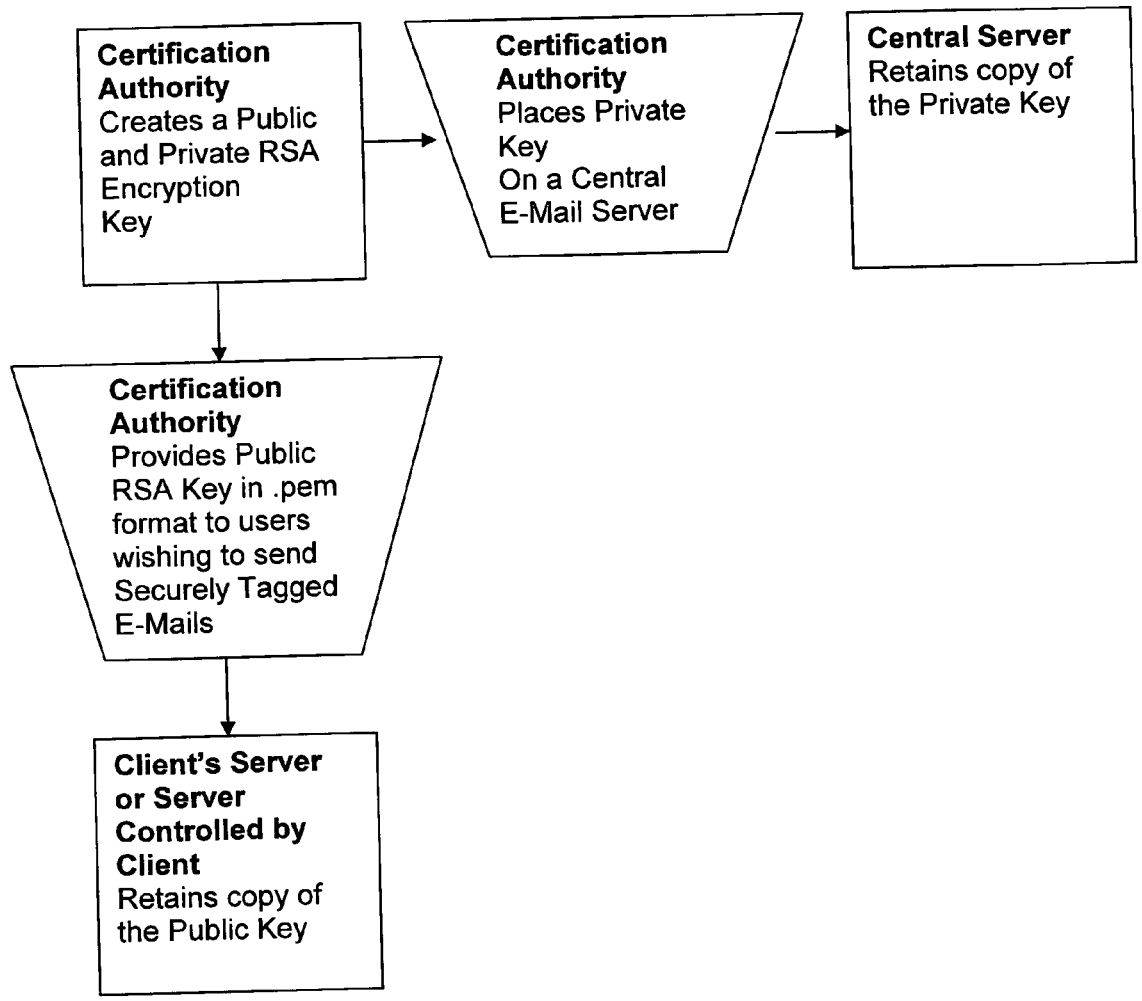
FIG. 2 is a flowchart illustrating Public/Private Key Encryption.

The software tool which generates the encoded identifier may reside on the sender's computer, or on a third party webserver or computer, or on the recipient's webserver or computer. The system of the invention preferably uses Public/Private Key Encryption ("PKI"), as illustrated in FIGS. 1 and 2.

Distribution of Public and Private Encryption Keys

To facilitate the use of Public/Private Key Encryption, the system establishes a Certification Authority 10 capable of generating asymmetric encryption key pairs. Each e-mail recipient 12 must have a Public and Private Encryption Key Pair assigned by the Certification Authority central server 10. The Private Key is retained by the central server 10, also referred to as the "trusted server" since the Private Key is secure from unauthorized access, and the Public Key is distributed to the e-mail recipients 12, also referred to herein as the "clients". For the purpose of this example, a 1024 bit RSA key generation process is used. An RSA key pair is generated for each client 12. In the example below, the key pair is called "test_private_key" and "test_public_key":

Example of Private Key

```
-----BEGIN RSA PRIVATE KEY-----
MIICXAIBAAKBgQCyg5z/IdfU2dKoEm2zpDdHb3M7Jdy9p+ncsUhR4NFmd5SuK8Kf
afLsOO5588HezksnMHw6Venk4ajia1U21zfZuuPX59segwEFdHCgSiER0MHC2fVW
1Bzlktidc+3l4o10kEvFBx92WP0LX7VKZnAurMbyWnYNlAmKNH3OvDmZrwIDAQAB
AoGAJ8S6TPw1IO4Fx/uTBNoolnl1qk+dBYNKzieQfO0guTsanFKTYQAxZf6o4fIz
1ncOtwROKJDLMnozLX3L1gWKI1ADDu4/ziOWt1R08gE95YzDg/LNHnk3wrYmNuZs
GJy1tL6xJ6w0QLUKF6LTQvsaB14pKhj1/wZliwMXfL8NUcECQQDZ7vI0NcyKEOzC
pAAkdubirG2Gx5Y0+Y/pSTBtQLplJ7NNkmyt/a4Sb2kXcBRFTMAjAJpLG6O91XBj
kBJYEHDtAkEA0bIBUBLMF262cnX2lnJcHpl1eif6lX12PhgavoXo/F/6alFuRvfB
GVYA4Yn78cc6fkNS1SNJN1VSMfRU5QlNiwJBAJx+hnRRcahvUOTQSb3lmBSLxzay
mb0+vEXEJb8+bNr4sDvy+pHSia55TFjlRdkhrRM1epaWqXVHEKaeLV4JqF0CQB4l
p0apzSm5QwWlq/PpMRE9IsSTJtWDGhLHSGEHw301Fz1dw6r0R5Cq6qmCOvSBngk1
CJ2X2xjXbV+9Ls9WzQ0CQBoK8kcmkqVFdKLHdmBWYPPpSOzuzSLsoD4G9tJ32bnI
VD9ooas+TD2sWIvyl5TPc965gyVKJrilILhMaeWxHZU=
-----END RSA PRIVATE KEY-----
```

Example of Public Key

```
-----BEGIN PUBLIC KEY-----
MIGfMA0GCSqGSIb3DQEBAQUAA4GNADCBiQKBgQCyg5z/IdfU2dKoEm2zpDdHb3M7
Jdy9p+ncsUhR4NFmd5SuK8KfafLsOO5588HezksnMHw6Venk4ajia1U2lzfZuuPX
59segwEFdHCgSiER0MHC2fVW1Bzlktidc+3l4o10kEvFBx92WP0LX7VKZnAurMby
WnYNlAmKNH3OvDmZrwIDAQAB
-----END PUBLIC KEY-----
```

As illustrated in FIG. 2, the Public Key is transmitted to the client 12 in .pem format. ".pem" format is a standard key format which uses base 64 encoding, so it will not fail in a 7-bit transfer to the client. The client 12 must then save the Public Key on its web server 20 that will be used to generate e-mail tags. The Private Key is retained on the central server 10 and is used to decrypt incoming e-mails 16.

Figure 3:
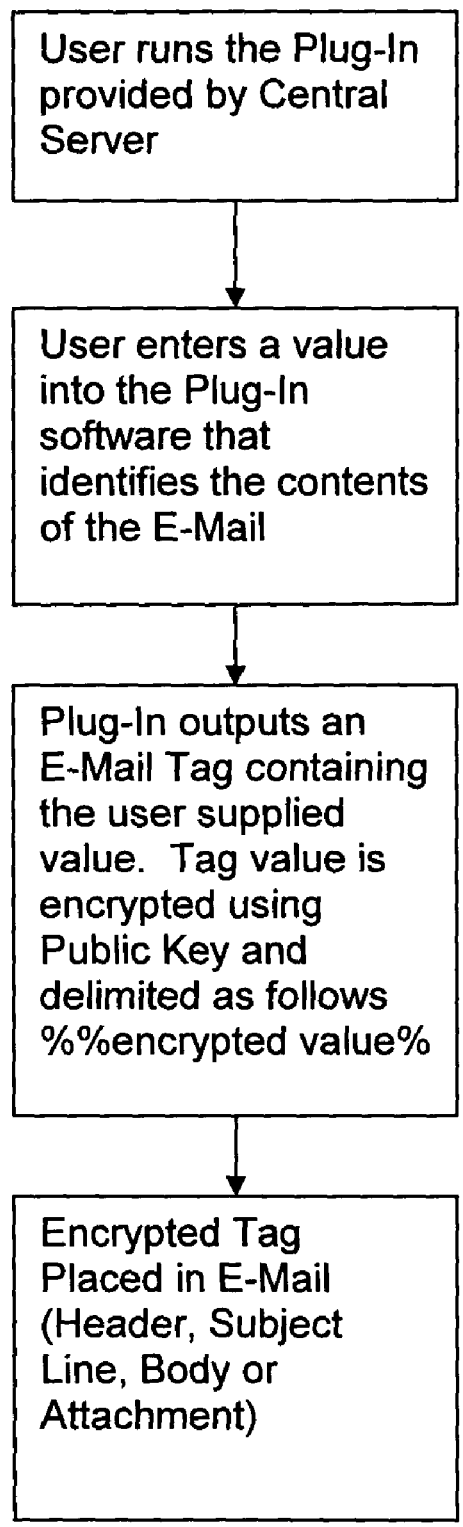
FIG. 3 is a flowchart illustrating the method of the invention.

The process for asynchronously generating an encrypted tag in an e-mail is illustrated in FIG. 3. The end user 14 can tag an e-mail by visiting the client's website 12, producing a tag and placing the tag in the e-mail. The task of producing a tag can be performed in a number of ways. The following are examples of two methods.

First, the end user 14 can visit the client 12 website, enter a value to be represented in the tag and then click on a link on the client's website causing the end user's e-mail program to automatically launch with the tag embedded in the Subject Line of the e-mail.

Alternatively end user 14 can visit the client's website 12, enter a value to be represented in the tag and click on a link on the client's website 12 causing the tag to display on the end user's screen. The end user can then copy the tag using his/her browser and paste the tag into the e-mail.

In both of these cases, the technique for generating the tag is the same. The value to be represented in the tag is provided by the end user 14. The value's content depends on the application in question. The value can be an Account Number, a File Number or some other form of identifier. The value can be provided by the end user 14 or be generated by some other process related to the clients application. The process of providing this "tag value" is completely unrelated to the central server 10 and is performed without any foreknowledge of its content, hence it is asynchronous.

Example Value: 9876543210

The tag value is then input into a computer program that resides on the client's server 12 or on a server controlled by the client. This server must have: a) a copy of the Public Key provided by the central server 10; b) a software package, herein called a "plug-in", that can take the tag value and the Public Key as input and output an encrypted version of the value.

The following is an example of a command line input in the Perl software language (where the command is called ifaxudt.pl):

ifaxudt.pl public_key.pem "9876543210"

Additionally, the encoded tag should be identified by a delimiter, such as:

%%encoded value%

The following is an example of the encrypted output produced by the "plug-in":

Example Encrypted Tag

%%SG/RsYVmy5HcFmlFsq92h0tQY1WkpqC95JF4puTV72d7hFVPBAYhaoO/dF1DwI0a
n4ChAuoCeDTQhiBfMuA0dTGu6+AylloX4hgYHul/TdNs9C70REDk0FS/RwyFeO0g
DGx6WtINXPN18HhpAOyBAuOtadsg0sQ9abgXdJHj/m8=%

The tag is then inserted into the e-mail. This can be performed: a) automatically by a software program designed to launch the end user's e-mail application with the tag embedded in the Subject Line; b) manually by the end user who copies the tag from the client's server into the e-mail; or c) by a software tool designed to place the tag into the e-mail.

While in FIG. 1 the encrypted tag is shown as generated by the recipient 12 server, this tag could also have been generated by a Third Party Server or the End User's Server, if these servers were trusted servers possessing copies of the Public Key.

The sender can then send the e-mail with the encrypted tag in the e-mail, contained within the Subject Line, Body or Attachments in the e-mail. The invention then allows a server connected to the Internet to: a) receive the tagged e-mail; b) decode the encrypted tag using the private encryption key; and c) identify the e-mail by reading the contents of the tag.

Figure 4:
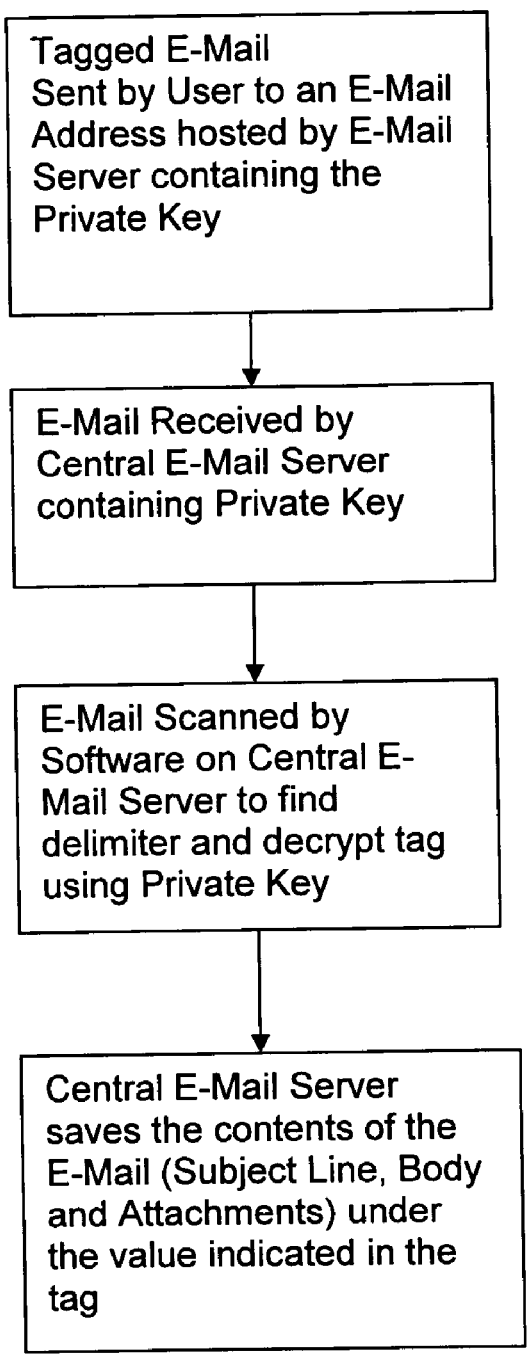
FIG. 4 is a flowchart illustrating the method of the invention.

The process of sending and processing a tagged e-mail is illustrated in FIG. 4. When an end user 14 sends a tagged e-mail, he/she sends the e-mail to an e-mail address on the Central Server 10. The Central Server 10 receives the e-mail and a copy of the Private Key is used to decrypt the e-mail tag. The encrypted e-mail tag is located and decrypted. When a tagged e-mail is received by the central server 10, the e-mail is opened and the encrypted tag is located based on the existence of the delimiters found at the beginning of the tag "%%" and the delimiter found at the end of the tag "%". Once the contents of the tag are located between the delimiters (e.g. %%encrypted value%), the tag is extracted and decrypted.

The following is an example of a command using Open SSL with the RSA private key where the terms "encrypted_tag" and "decrypted_tag" refer to the input of the encrypted tag found in the e-mail and the decrypted output produced by the system:

openssl rsautl-decrypt-inkey private_key.pem-in encrypted_tag-out decrypted_tag

Once the tag value is decrypted, the system then saves the E-mail Subject Line, Body and Attachments using the "tag value" in the file names.

The routing or saving of the tagged e-mail content is carried out as follows. When the central server 10 has received the tagged e-mail 16, has decrypted the encrypted tag and saved the e-mail's content under the tag value, the e-mail's content can then be processed in various ways based upon the contents of the tag and the requirements of the e-mail recipient 12. In the preferred embodiment of the invention, the e-mail's contents are divided into its component parts:

1. The E-Mail Subject Line and the Body are saved in a text file (with a .txt extension) and named with the "tag value" (e.g. tag_value.txt), hence forth called the "E-Mail Text File".

2. The Attachments are renamed with the "tag value" as a prefix to the attachment's original name (e.g. if the Attachment was named "document.doc" the resulting file is called "tag_value_document.doc"), henceforth called the "E-Mail Attachment File".

Then the E-Mail Text File and the E-Mail Attachment File are sent to the client's server using a transport layer encryption, such as Secure FTP or SSH. Clients receiving these files can then perform a number of functions based upon the contents of the tag value. For example:

1. The E-Mail Text and Attachment Files can be saved in a database associated with other relevant information.

2. The E-Mail Text and Attachment Files can be routed to the attention of relevant personnel, based on the information in the tag and a set of rules predetermined by the client.

3. The E-Mail Text and Attachment Files can cause processes to launch in the memory of the client's server or in the client's business, e.g. the arrival of a specific document could start the processing of an insurance claim.

In operation of the invention in practice, clients 12 will be registered to receive e-mails via the system. Typically these clients will be companies that receive large volumes of e-mails related to specific business transactions. The operator of the system will typically act as the Certification Authority 10 and will issue a Public Key for use by all end users 14 sending e-mails to the clients 12. The Certification Authority 10 will retain the Private Key on the central server. All e-mails sent to the clients 12 via this system will pass through the central server of the Certification Authority 10 and be scanned for the existence of the e-mail tag 18. Tags will be decoded using the Private Key held on file by the Certification Authority 10 on the central server. The contents of the e-mail 18 will then be deconstructed, so that the Subject Line and Body will be placed in a text file named with the value in the tag and the e-mail attachments will be re-named with the value in the tag as a suffix to the original names assigned by the sender. The text file containing the Subject Line and Body and the Attachments will then be sent to the client's computer using FTP or Secure FTP. When the client 12 has received the files from the central server 10, the client can then use the information contained within the tag to process the e-mail contents automatically.

The tagging of e-mails by a sender 14 can be used in many ways:

1. To ensure an audit trail for e-mails. For example, e-mails being sent to a government department could be tagged by the sender to ensure that the e-mail is logged against a particular matter (e.g. an IRS audit).

2. To facilitate the archival of e-mails. For example, during drug trials, participants and the drug company exchange information related to aspects of the trial. These interactions must be logged and available for an audit by the supervising agency (e.g. the FDA).

3. To gather information about an on-line transaction that is comes from a third party. For example, a title insurance company may require supporting information to complete a property transaction. An e-mail from a buyer's insurance company could be sent with the tag, so that the e-mail automatically affixes to the correct transaction.

4. To facilitate the gathering of information. For example, an auditor could send tagged e-mails with questions to persons participating in the audit. When responses are sent to the e-mails, the system could capture and archive the answers as part of the audit process.

There are many tools on the market for the Encryption of E-Mails and their content. Protocols like S/MIME allow the contents of an e-mail to be encrypted. Protocols like TLS (Transport Layer Security) use Secure Socket Layer (SSL) to encrypt the e-mail while in transit between two e-mail servers. The invention described here does not relate to the "transport" encryption of the e-mail or the encryption of the "contents". The invention described herein can operate with or without S/MIME or TLS, as the invention described here deals with the encryption of the identification of the e-mail content, not with the encryption of the e-mail content itself.

Thus the present invention provides a method of receiving and filing an e-mail wherein the e-mail is tagged with a unique identifier by the sender asynchronously, without concurrently contacting the recipient's server, so that the e-mail can be automatically filed a) without human intervention; b) without the prospect of human or machine error; and c) without the requirement for prior contact with the recipient's server. Further the tag is protected from tampering or decoding by unauthorized personnel, so that e-mails that are tagged can be filed with the comfort that they have not been misidentified or fraudulently labeled.

A user can therefore encode an e-mail tag asynchronously, without communicating with the client's server to encode the e-mail. The encoded e-mail tag cannot be read by a hacker as it is encoded using PKI, so the filing scheme used by the client can remain secret even when the e-mail is sent over the public Internet. The client can take comfort that only authorized e-mails are processed automatically. E-mails and attachments can be FTPed directly to a client's workflow process without human intervention and with the certainty of knowing that the e-mail tag is valid. Clients' Private Key will remain secure. Only the Certifying Authority 10 can decode the tag. Users who send an e-mail can access the tagging software, which is a stand-alone software tool, in many ways, including a Browser Plug-In on their desktop or a Server Plug-In on a third party's server.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A method of automatically processing an electronic mail message sent from a sending computer to a recipient computer, the method comprising the steps of:
   i) a trusted server generating a public encryption key to encrypt tags for inclusion in electronic mail messages, and a corresponding private encryption key stored on said trusted server;
   ii) said recipient computer determining one or more identification codes and corresponding actions which define how electronic mail messages will be automatically processed by said recipient computer and communicating said one or more identification codes and corresponding actions to said sending computer;
   iii) said sending computer, prior to sending said electronic mail message, selecting one of said one or more identification codes, based on said corresponding actions entering said selected identification code into computer-implemented means for generating an encrypted tag and receiving from said tag generating means an encrypted tag, wherein said encrypted tag contains said selected identification code which has been encrypted by said public encryption key;
   iv) said sending computer adding said encrypted tag to said electronic mail message to form a tagged electronic mail message;
   v) said sending computer forwarding said tagged electronic mail message to said trusted server;
   vi) said trusted server decrypting said encrypted tag using said private key;
   vii) said trusted server forwarding said decrypted tag and said electronic mail message to said recipient computer; and
   viii) said recipient computer automatically processing said electronic mail message based on said selected identification code and corresponding action;

wherein said automatic processing step is selected from the group consisting of:
   a) storing said email according to said selected identification code;
   b) routing said email according to said selected identification code; and
   c) commencing a further processing application according to said selected identification code.

2. A method according to claim 1 wherein said sending computer receives said encrypted tag by visiting a website comprising said computer-implemented means for generating an encrypted tag recipient computer, entering said selected identification code, and receiving said encrypted tag.

3. A method according to claim 1 wherein said sending computer receives said encrypted tag by visiting a website comprising said computer-implemented means for generating an encrypted tag said recipient computer, entering representative message processed said selected identification code, and said sending computer then causing said sending computer's electronic mail program to launch on said sending computer with said-encrypted tag embedded in the electronic mail message.

4. A method according to claim 1 wherein said sending computer receives said encrypted tag by visiting a website comprising said computer-implemented means for generating an encrypted tag recipient computer, said selected identification code, causing said encrypted tag to display on said sending computer's screen, and then said sending computer copying and pasting said encrypted tag into the electronic mail message.

5. A method according to claim 1 wherein said sending computer receives said encrypted tag by visiting a website comprising said computer-implemented means for generating an encrypted tag recipient computer, entering said selected identification code and said sending computer causing an e-mail program to launch on said sending computer with said encrypted tag embedded in the subject line of the electronic mail message.

6. A method according to claim 1 wherein said encrypted tag is provided with pre-determined delimiters for identifying said encrypted selected identification code.

7. A method according to claim 1 wherein said public key is stored on said recipient computer.

8. A method according to claim 1 wherein said recipient computer comprises a recipient web server and said public key is stored on said recipient's web server.

9. A method according to claim 6 wherein said trusted server decrypts said encrypted tag using said private key by locating said encrypted selected identification code based on the location of said delimiters, extracting and decrypting said encrypted selected identification code.

10. A method according to claim 1 wherein said trusted server forwards said decrypted selected identification code and said electronic mail message to said recipient computer by saving the e-mail's content in files associated with the decrypted selected identification code and forwarding said files to said recipient computer.

11. A method according to claim 1 wherein said trusted server forwards said decrypted selected identification code and said electronic mail message to said recipient computer by dividing said electronic mail message into its plurality of component parts and saving such component parts in files associated with the decrypted selected identification code and forwarding said files to said recipient computer.

12. A method according to claim 11 wherein said component parts comprise are selected from the group consisting of the electronic mail message subject line, electronic mail message body and electronic mail message attachments.

13. A method according to claim 12 wherein said files associated with the decrypted selected identification code comprise an electronic mail text file and an electronic mail attachment file.

14. A data processing system for automatically processing electronic mail messages sent from a sending computer to a recipient computer, said data processing system comprising:
 i) a digitally-communicative network comprising said sending and receiving computers and a trusted server, said recipient computer comprising memory means for storing a public encryption key, and said trusted server comprising memory means for storing a corresponding private encryption key;
 ii) means associated with said receiving computer for selecting one or more identification codes and corresponding actions which define how electronic mail messages will be automatically processed by said receiving computer and communicating said one or more identification codes and corresponding actions to said sending computer;
 iii) means for generating an encrypted tag, wherein said encrypted tag contains one of said identification codes which has been encrypted by said public key;
 iv) means associated with said sending computer for, prior to sending said electronic mail message, selecting one of said one or more identification codes based on said corresponding actions, and entering said selected identification code into said means for generating an encrypted tag and receiving from said tag-generating means an encrypted tag, wherein said encrypted tag contains said selected identification code which has been encrypted by said public key;
 v) means in said sending computer for receiving an encrypted tag and adding said encrypted tag to an electronic mail message to form a tagged electronic mail message;
 vi) means in said sending computer for forwarding said tagged electronic mail message to said trusted server;
 vii) means in said trusted server for decrypting said encrypted tag using said private key;
 viii) means in said trusted server for forwarding said decrypted tag and said electronic mail message to said recipient computer; and
 ix) means in said recipient computer for automatically processing said electronic mail message based on said decrypted selected identification and corresponding action wherein said automatic processing step is selected from the group consisting of:
 a) storing said email according to said selected identification code;
 b) routing said email according to said selected identification code; and
 c) commencing a further processing application according to said selected identification code.

15. A method according to claim 1 wherein the recipient computer interacts with a related filing system including a plurality of file numbers and said one or more identification codes which determine how electronic mail messages will be automatically processed by said receiving computer comprise a number corresponding to a file number in said filing system.

16. A method according to claim 1 wherein said email message comprised in said tagged email message is not encrypted by said public encryption key.

17. A data processing system according to claim 14 wherein said recipient computer comprises a recipient web server and said public key is stored on said recipient's web server.

* * * * *